United States Patent [19]

Bowers et al.

[11] Patent Number: 5,535,049
[45] Date of Patent: Jul. 9, 1996

[54] PHASE AND BIREFRINGENCE ABERRATION CORRECTION

[75] Inventors: Mark Bowers, Modesto; Allen Hankla, Livermore, both of Calif.

[73] Assignee: The Regents of the University of California, Oakland, Calif.

[21] Appl. No.: 240,898

[22] Filed: May 11, 1994

[51] Int. Cl.⁶ ..................................................... H01S 3/00
[52] U.S. Cl. ........................................ 359/334; 359/338
[58] Field of Search ..................................... 359/334, 338

[56] References Cited

U.S. PATENT DOCUMENTS

| | | |
|---|---|---|
| 4,005,935 | 2/1977 | Wang . |
| 4,220,928 | 9/1980 | Bloom et al. . |
| 4,321,550 | 3/1982 | Evtuhov . |
| 4,745,787 | 2/1988 | Chandra . |
| 4,778,261 | 10/1988 | Boyd . |
| 4,794,344 | 12/1988 | Johnson . |
| 4,869,578 | 9/1989 | Fukuda . |
| 4,902,980 | 2/1990 | O'Meara . |
| 4,943,782 | 7/1990 | Stephens et al. . |
| 4,958,908 | 9/1990 | Rockwell et al. . |
| 5,038,359 | 8/1991 | Pepper et al. . |
| 5,155,542 | 10/1992 | Rampolla et al. . |

*Primary Examiner*—Mark Hellner
*Attorney, Agent, or Firm*—Henry P. Sartorio; John P. Wooldridge

[57] ABSTRACT

A Brillouin enhanced four wave mixing phase conjugate mirror corrects phase aberrations of a coherent electromagnetic beam and birefringence induced upon that beam. The stimulated Brillouin scattering (SBS) phase conjugation technique is augmented to include Brillouin enhanced four wave mixing (BEFWM). A seed beam is generated by a main oscillator which arrives at the phase conjugate cell before the signal beams in order to initiate the Brillouin effect. The signal beam which is being amplified through the amplifier chain is split into two perpendicularly polarized beams. One of the two beams is chosen to be the same polarization as some component of the seed beam, the other orthogonal to the first. The polarization of the orthogonal beam is then rotated 90° such that it is parallel to the other signal beam. The three beams are then focused into cell containing a medium capable of Brillouin excitation. The two signal beams are focused such that they cross the seed beam path before their respective beam waists in order to achieve BEFWM or the two signal beams are focused to a point or points contained within the focused cone angle of the seed beam to achieve seeded SBS, and thus negate the effects of all birefringent and material aberrations in the system.

20 Claims, 5 Drawing Sheets

PHASE AND BIREFRINGENCE ABERRATION CORRECTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to beam aberration correction, and more specifically, to the correction of phase and birefringence aberrations with seeded Brillouin scattering and Brillouin enhanced four wave mixing.

2. Description of Related Art

In the attempt to achieve greater power and energy capability from a laser system, it is necessary to increase the diameter of the optics used therein. As the size of optics and amplification mediums increase, the thermal, material and birefringence distortions increase beyond that which can be accepted in a usable system. Two main methods have been used to address this problem thus far: slab amplifier design and phase conjugation. The slab design is expensive to incorporate and does not completely correct for the previous problems mentioned.

U.S. Pat. No. 4,778,261, directed to a method and apparatus for optical phase conjugation, which apparatus is also known as a phase conjugate mirror, utilizing Brillouin enhanced four wave mixing in which a forward going pump wave and a backward going pump wave have frequencies which differ by twice the Brillouin frequency of the medium. The probe wave and the conjugate wave, which is obtained by Brillouin enhanced four wave mixing in the medium, have the same frequency, which differs from the pump wave frequencies by the Brillouin frequency of the four wave mixing medium. High reflectivity (gain) is obtained as a result of Brillouin resonance enhancement. The backward going pump wave is created from the forward going pump wave which is transmitted through the four wave mixing medium. The two pump waves are therefore phase conjugates of each other and the quality of the phase conjugation process is not degraded even by the use of an aberrated pump wave.

U.S. Pat. No. 4,869,578, directed to a gasdynamic gas flow, forms a lightguide wherein an incident coherent light wavefront, such as a laser beam, is reflected to produce a backward-traveling phase conjugated light wavefront. The nonlinear optical phase conjugation process occurs when the incident light intensity is large enough to achieve the intensity threshold required to initiate the phase conjugation process.

U.S. Pat. No. 4,958,908 is directed to a coherent input beam from a laser which is fed into a Brillouin-enhanced four wave mixer which generates a phase conjugated seed beam in counterpropagation with the input beam. A Brillouin amplifier is provided between the laser and four wave mixer to transfer energy from the input beam to the seed beam and thereby amplify the seed beam to produce a phase conjugated output beam with approximately 50% of the energy of the input beam and narrow bandwidth which is free from random phase jumps associated with the acoustic noise generally required to initiate and sustain stimulated Brillouin scattering. The phase conjugated output beam can be modulated or steered in any direction as desired. Reference beams for the four wave mixer may be derived from the same laser source as the input beam and have energies one or more orders of magnitude smaller than the energy of the input beam.

U.S. Pat. No. 5,155,542, discloses a coherent energy transfer system which utilizes a doublet pulse laser transmitter in combination with a phase conjugate mirror (PCM) assembly. In one embodiment of the present invention, the first pulse of the doublet pulse signal illuminates the target, whereas the return pulse reflected from the target constitutes a weak signal to be processed using phase conjugate methods. The second pulse of the doublet phase signal activates the PCM assembly and constitutes the energy source used to produce an amplified, phase conjugated beam.

SUMMARY OF THE INVENTION

It is an object of the present invention to provide a Brillouin enhanced four wave mixing phase conjugate mirror which corrects for phase aberrations of a coherent electromagnetic beam and birefringence induced upon that beam.

In the general seeded design of the invention, a simple stimulated Brillouin scattering phase conjugation is augmented to include Brillouin enhanced four wave mixing. A seed beam is generated by the main oscillator, but it may be any source of the same wavelength, which arrives at the phase conjugate cell before the signal beams in order to initiate the Brillouin effect. The signal beam which is being amplified through the amplifier chain, or an optical path with distortions, is split into two perpendicular polarized beams. One of the two beams is chosen to be the same polarization as some component of the seed beam, the other orthogonal to the first. The polarization of the orthogonal beam is then rotated 90° such that it is parallel to the other signal beam. The three beams are then focused into cell containing a medium capable of Brillouin excitation. The two signal beams are focused such that they cross the seed beam path before their respective beam waists in order to achieve BEFWM or the two signal beams are focused to a point or points contained within the focused cone angle of the seed beam. In this arrangement, the seed beam initiates a phonon seed which is amplified by the seed beam until the seed beam is phase conjugated and returns upon its same path. As the seed beam returns along its incoming path it interferes with the two signal beams to produce a standing wave pattern. This pattern excites phonons to form a grating pattern. This grating pattern is most constructive when the two signal beams are phase conjugated. Therefore, the two signal beams will also be phase conjugated and return along the same path on which they came. The phase difference caused by birefringence before the polarized beam splitter is exactly reversed in this process. As the signal beams are recombined on their return trip and pass through the birefringent medium the phase shift induced on the initial trip through the system is canceled, and thus negating the effects of all birefringent and material aberrations in the system.

DETAILED DESCRIPTION OF THE INVENTION

Figure 1:
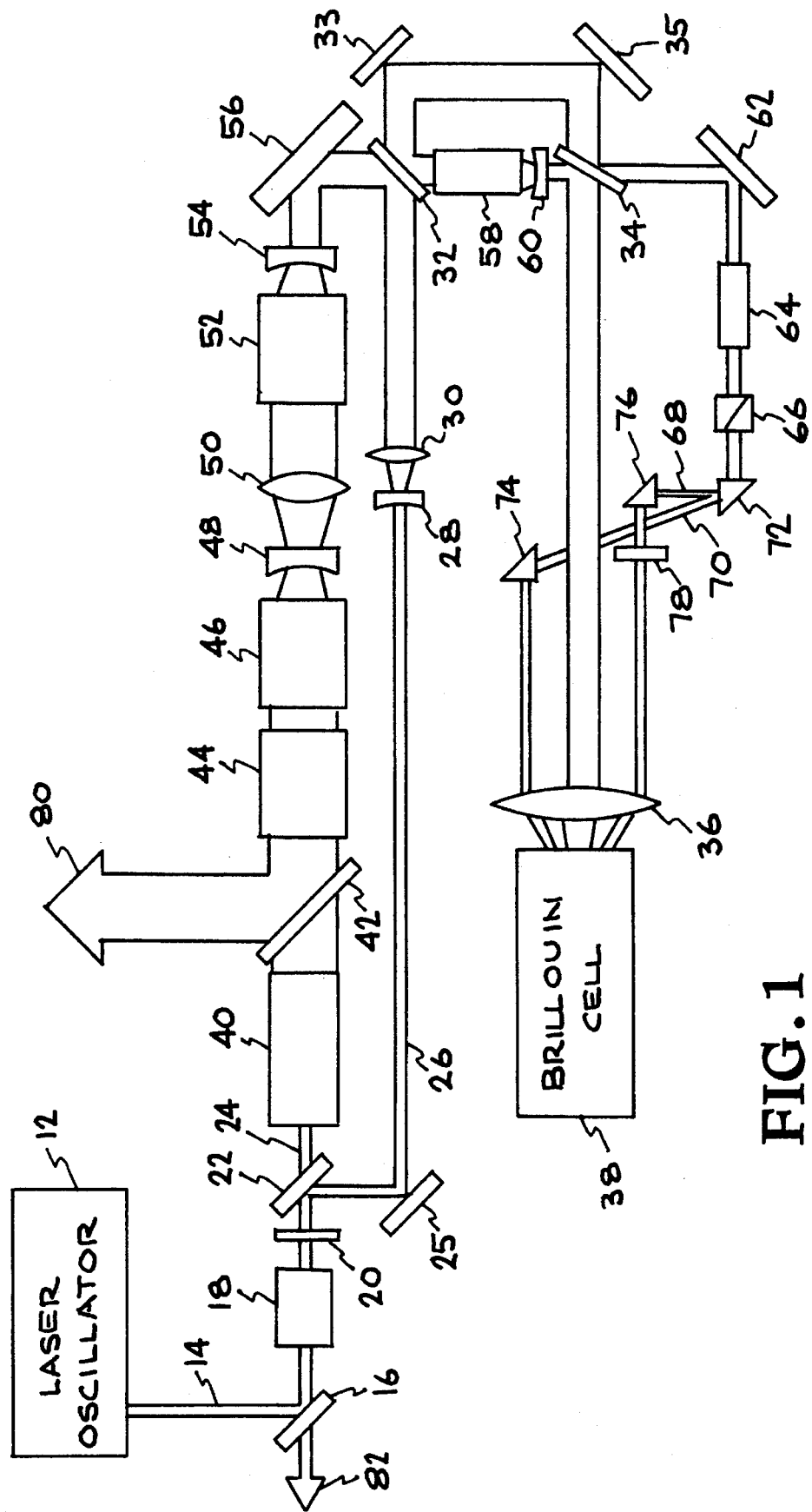
FIG. 1 is a seeded Brillouin enhanced four wave mixing laser with birefringence correction and optical isolation.

FIG. 1 is one embodiment of an apparatus for the correction of phase and birefringence aberrations with seeded stimulated Brillouin scattering and Brillouin enhanced four wave mixing. Laser oscillator 12 is an Nd:YAG laser, and provides a 300 mJ beam 14 with 10 ns pulses at 10 Hz of 1064 nm wavelength light. Beam 14 is incident at 45° on thin film polarizer 16, and after reflecting therefrom, propagates normally through a 10 mm aperture Faraday rotator 18 and then through half wave plate 20. Beam 14 is then split into two orthogonally polarized beams by thin film polarizer 22. The portion of beam 14 which passes through polarizer 22 is denoted beam 24, and in this embodiment, is approximately 20 µJ. The portion of beam 14 which is reflected off polarizer 22 and mirror 25 is denoted seed beam 26, and is approximately 300 mJ.

Seed Beam 26 is expanded by negative lens 28 and is then recollimated by positive lens 30. Seed beam 26 is incident upon a first saturable absorber 32, which bleaches, allowing transmission of seed beam 26 which reflects from mirrors 33, 35 and is then incident upon a second saturable absorber 34, which bleaches and also transmits seed beam 26. After passing through saturable absorber 34, seed beam 26 is focused by focusing lens 36 into a cell 38 which contains a medium such as acetone, $CCl_2$, Freon, $CS_2$, or a high pressure gas, which is capable of Brillouin excitation. The seed beam may be circularly polarized for later extraction.

After passing through polarizer 22, beam 24 passes through spatial filter 40, polarizer 42, 25 mm aperture Faraday rotator 44, a 25 mm aperture laser head 46, negative lens 48 having an focal length of 125 mm and a positive lens 50 having a focal length of 500 mm. Beam 24 then passes through a 25 mm aperture laser head 52, and a 250 mm focal length negative lens 54. After passing through lens 54, turning mirror 56 directs beam 24 through a first saturable absorber 32, 12.5 mm aperture laser head 58, negative lens 60, and a second saturable absorber 34. Following second saturable absorber 34, turning mirror 62 directs beam 24 through a 9 mm laser head 64 and Rochon prism 66, which splits beam 24 into two beams, beam 68 and beam 70, which reflect in different directions off a first 90° turning prism 72. Beam 70 has the same polarization as some component of beam 26, and after prism 72, is reflected by a second 90° turning prism. After reflection from prism 72, beam 68 is reflected from a third 90° turning prism 76. Beam 68 then passes through a half wave plate 78, which rotates the polarization of beam 68 such that it has the same orientation as beam 24 and some component of beam 26. Beam 68 and 70 are then focused, along with seed beam 26 as stated earlier, by lens 36 (which as a 150 mm focal length, and is 75 mm in diameter), into cell 38. Beams 68 and 70 are focused such that they cross the seed beam path before their respective beam waists in order to achieve BEFWM. Alternately, beams 68, 70 may be focused to a point or points contained within the focused cone angle of beam 26 to achieve SBS.

Figure 2:
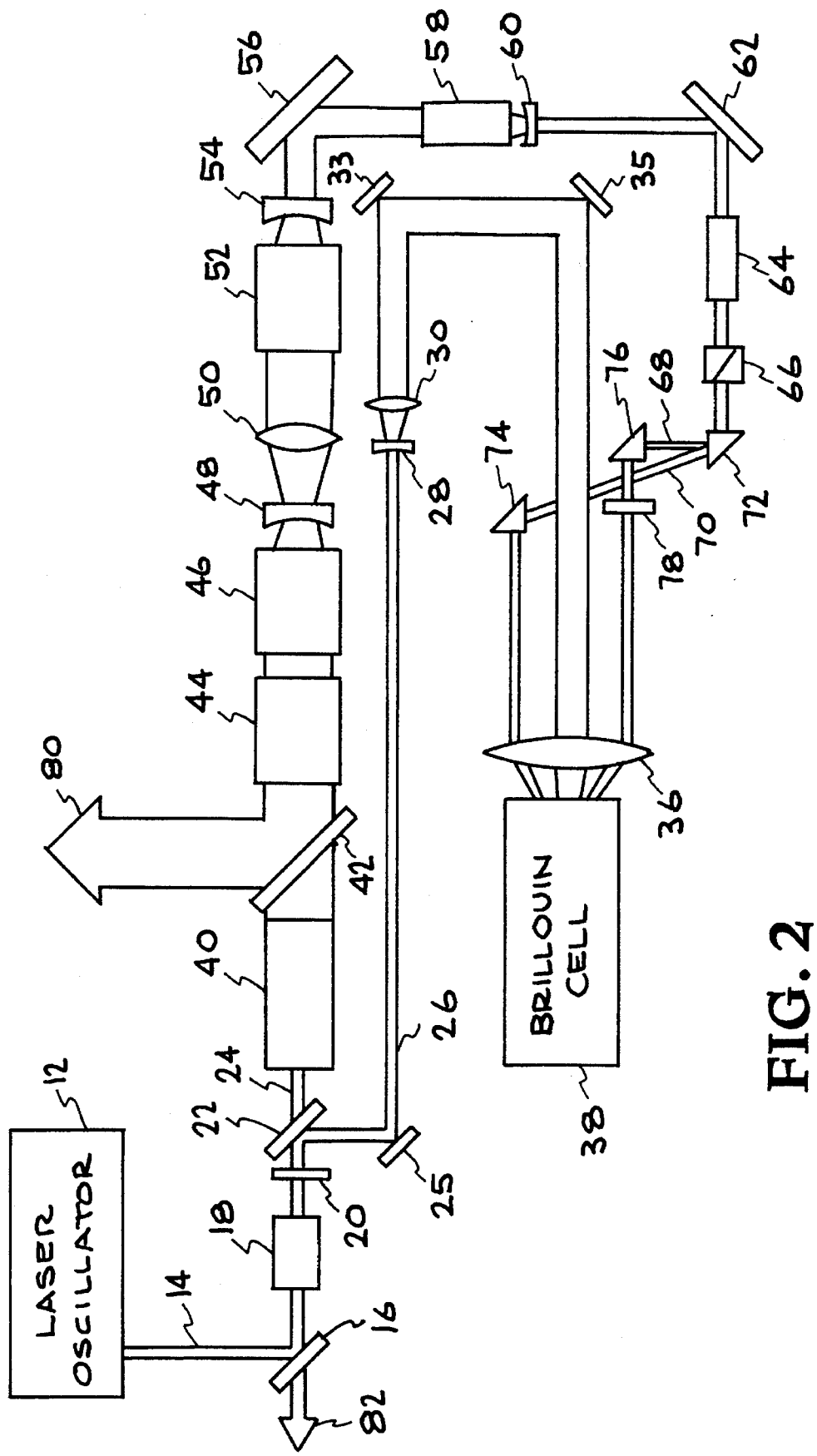
FIG. 2 is a seeded Brillouin enhanced four wave mixing laser with birefringence correction and no optical isolation.

The seed beam initiates a phonon seed which is amplified by the seed beam until the seed beam is phase conjugated and returns upon its same path. As the seed beam returns along its incoming path it interferes with the two signal beams to produce a standing wave pattern. This pattern excites phonons to form a grating pattern. This grating pattern is most constructive when the two signal beams are phase conjugated. Therefore, the two signal beams will also be phase conjugated and return along the same path on which they came. The phase difference caused by birefringence before the polarized beam splitter is exactly reversed in this process. As the signal beams are recombined on their return trip and pass through the birefringent medium, the phase shift induced on the initial trip through the system is canceled, thus negating the effects of all birefringent and material aberrations in the system. Accordingly, beams 68 and 70 recombine in Rochon prism 66 and this beam is denoted 80, which returns along its original path to exit the system as an output beam of approximately 20 joules at polarizer 42. Seed beam 82 returns along its original path to exit the system through polarizer 16. As shown in FIG. 2, the system may be configured without first and second saturable absorbers 32 and 34.

Figure 3:
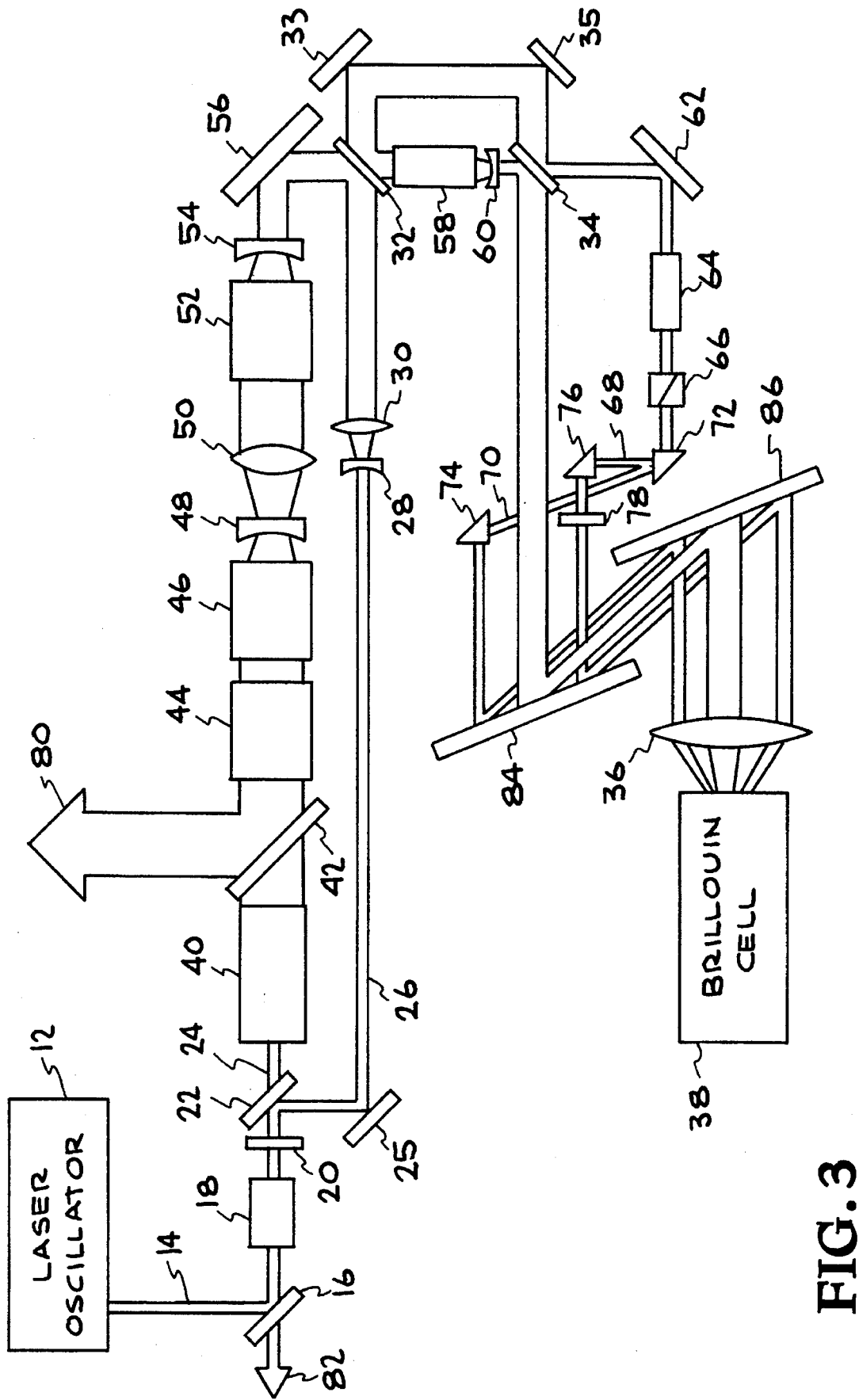
FIG. 3 shows phase conjugation with a seed beam for a wide bandwidth input laser and use of an optical isolator.
Figure 4:
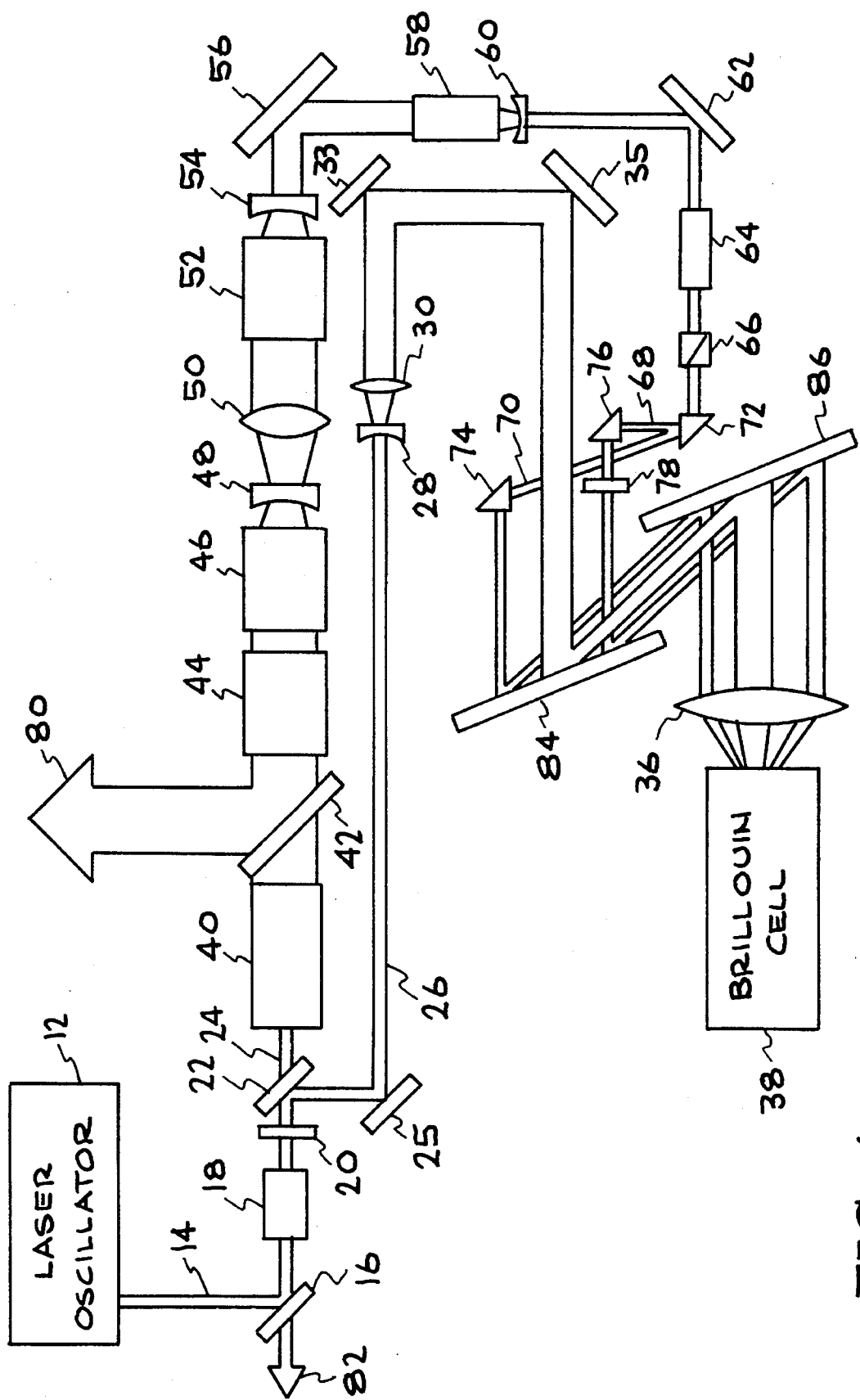
FIG. 4 shows phase conjugation with a seed beam for a wide bandwidth input laser without use of an optical isolator.

FIG. 3 shows a configuration which compensates for the use of a wide bandwidth laser. A spectrally dispersive element is added which spatially separates the wavelengths. After beam 68 passes through half wave plate 78, and beam 70 is reflected from 90° turning prism 74, beams 26, 68 and 70 are incident on a first grating 84 and a second grating 86, each grating having 1400 to 1700 lines per millimeter and blazed for the wavelength of the oscillator, in this case 1064 nm. FIG. 4 shows the system without optical isolators 32 and 34. With high gain amplification in each amplifier, the isolators are needed to suppress amplified stimulated emission.

Figure 5:
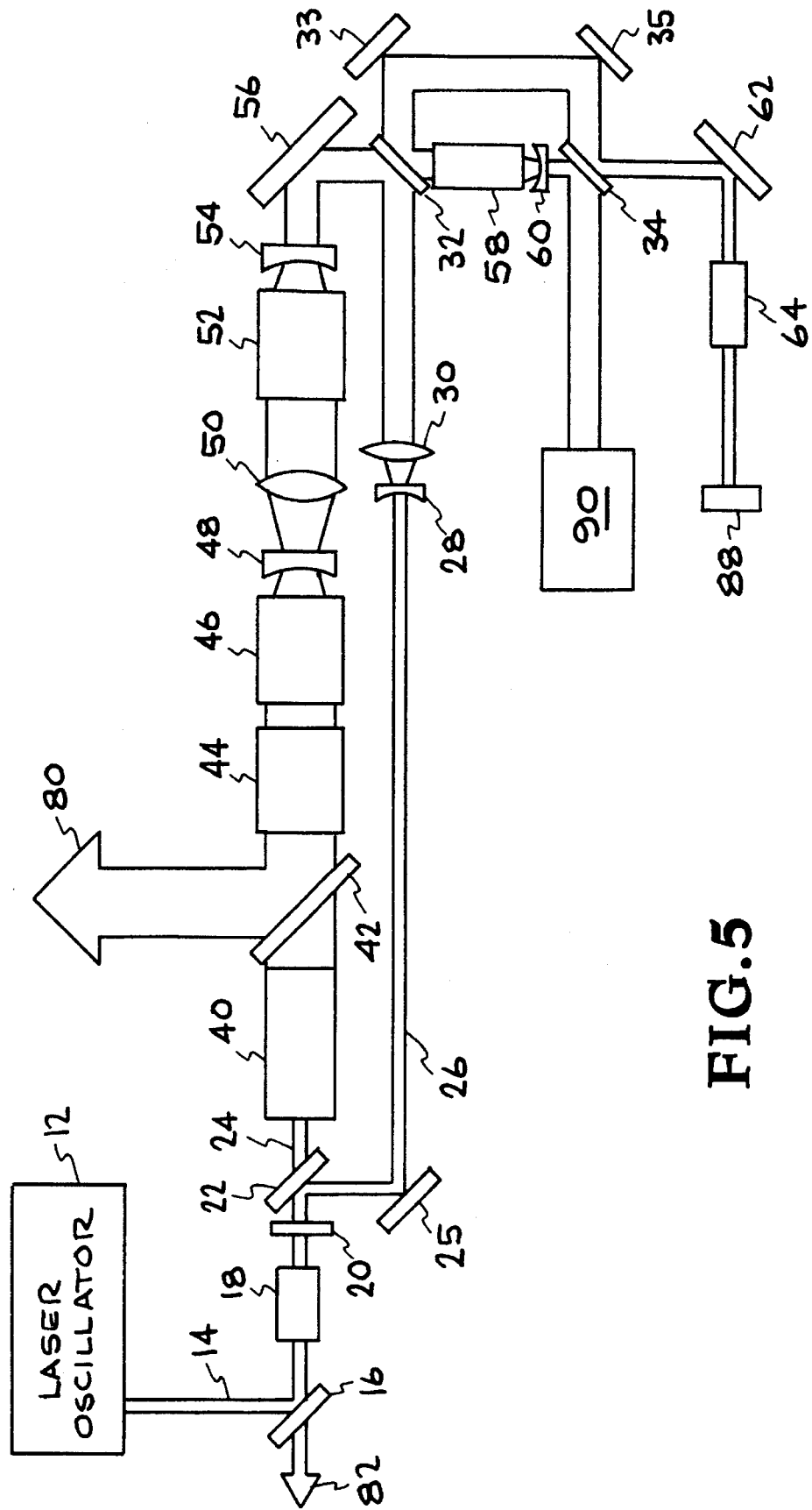
FIG. 5 shows a switchable optical isolator.

As shown in FIG. 5, seed beam 26 is passed through first and second saturable absorbers 32, 34, with beam 26 having a larger diameter than the beam being isolated, at a time before or during which the signal beam 24 to be isolated passes therethrough. Beam 26 saturates the absorbers 32, 34, making them transparent to the beam to be isolated. Thus, the beam path between isolators 32 and 34 is blocked until beam 24 is present. The seed beam 26 must be larger than the beam 24 to be isolated in order to maintain the spatial frequency content of beam 24.

Changes and modifications in the specifically described embodiments can be carried out without departing from the scope of the invention, which is intended to be limited by the scope of the appended claims.

We claim:

1. A method for the correction of phase and birefringence aberations in a coherent beam of light, comprising:

initiating, with a polarized seed beam, the Brillouin effect in a phase conjugate cell;

amplifying a signal beam;

splitting, with a birefringent medium, the signal beam into a first polarized beam and a second polarized beam, wherein the polarization of the first polarized beam is parallel to the polarization of the seed beam, wherein the polarization of the second polarized beam is perpendicular to the polarization of the first polarized beam and the seed beam;

rotating the polarization of the second polarized beam to be parallel to the polarization of the seed beam and the first polarized beam;

focusing the first polarized beam and the second polarized beam into the phase conjugate cell.

2. The method of claim 1, wherein the step of focusing the first polarized beam and the second polarized beam into the phase conjugate cell includes focusing the first polarized beam and the second polarized beam into the phase conjugate cell to cross the seed beam path before the first polarized beam and the second polarized beam each reach their respective beam waists to achieve Brillouin enhanced four wave mixing.

3. The method of claim 1, wherein the step of focusing the first polarized beam and the second polarized beam into the phase conjugate cell includes focusing the first polarized beam and the second polarized beam into the phase conjugate cell to a point contained within the focused cone of the seed beam, wherein a phonon seed is initiated and amplified to conjugate the seed beam and return the seed beam upon its path, wherein the seed beam interferes with the first polarized beam and the second polarized beam to produce a standing wave pattern which excites phonons to form a grating pattern that phase conjugates the first polarized beam and the second polarized beam and returns them along the same path on which they came; and further comprising recombining the first polarized beam and the second polarized beam in the birefringent medium, negating the effects of all birefringent and material aberations in the system.

4. The method of claim 1, wherein the step of focusing the first polarized beam and the second polarized beam includes reflecting the first polarized beam and the second polarized beam from a spectrally dispersive element before focusing the first polarized beam and the second polarized beam.

5. The method of claim 1, wherein the step of focusing the first polarized beam and the second polarized beam includes reflecting the first polarized beam and the second polarized beam from two gratings before focusing the first polarized beam and the second polarized beam.

6. The method of claim 1, wherein the step of focusing the first polarized beam and the second polarized beam includes reflecting the first polarized beam and the second polarized beam from two gratings before focusing the first polarized beam and the second polarized beam, wherein each grating has 1400 to 1700 lines per millimeter and is blazed for the wavelength of the first polarized beam and the second polarized beam.

7. The method of claim 1, wherein the step of amplifying a signal beam includes passing the seed beam through two saturable absorbers at a time before which the signal beam passed therethrough, wherein the seed beam has a larger diameter than the signal beam to be isolated, wherein the seed beam saturates the two absorbers, making them transparent to the signal beam to be isolated.

8. The method of claim 1, wherein the step of amplifying a signal beam includes passing the seed beam through two saturable absorbers at a time during which the signal beam passed therethrough, wherein the seed beam has a larger diameter than the signal beam to be isolated, wherein the seed beam saturates the two absorbers, making them transparent to the signal beam to be isolated.

9. The method of claim 1, wherein the step of initiating the Brillouin effect includes producing a polarized seed beam with an Nd:YAG laser, providing a 300 mJ beam with 10 ns pulses at 10 Hz of 1064 nm wavelength light.

10. The method of claim 1, wherein the step of initiating the Brillouin effect includes initiating the Brillouin effect in a phase conjugate cell which contains a medium selected from a group consisting of acetone, $CCl_2$, Freon and $CS_2$.

11. The method of claim 1, wherein the step of initiating the Brillouin effect includes initiating the Brillouin effect in a phase conjugate cell which contains a high pressure gas.

12. The method of claim 1, wherein the step of initiating the Brillouin effect includes initiating, with a circularly polarized beam, the Brillouin effect in a phase conjugate cell.

13. An apparatus for phase and birefringence correction, comprising:

a laser oscillator;

a polarized beam of light produced by said oscillator;

a first thin film polarizer to reflect said polarized beam of light;

a Faraday rotator in series combination with a first half wave plate to rotate said polarized beam of light;

a second thin film polarizer to split said beam of light into two orthogonally polarized beams comprising a signal beam and a seed beam;

a first series of optical elements comprising a first negative lens, a first positive lens, a first saturable absorber, a first laser head, a second negative lens, a second saturable absorber, a focusing lens and a cell containing a medium which is capable of Brillouin excitation, wherein said seed beam propagates through said first series of optical elements to be focused by said focusing lens into said cell; and a second series of optical elements comprising a spatial filter, a polarizer, a second Faraday rotator, a second laser head, third negative lens, a second positive lens, a third laser head, a fourth negative lens, a first turning mirror, said first saturable absorber, said first laser head, said second negative lens, said second saturable absorber, a fourth laser head, a Rochon prism and a first 90° turning prism, wherein said signal beam passes through said second series of optical elements to be separated by said Rochon prism into two orthogonally polarized beams comprising a first polarized beam and a second polarized beam, wherein the polarization of said first polarized beam is parallel to the polarization of said seed beam, wherein the polarization of said second polarized beam is perpendicular to the polarization of said first polarized beam and said seed beam, wherein said second polarized beam is reflected from a second 90° turning prism and then passes through a second half wave plate to be focused by said focusing lens into said cell;

wherein said first polarized beam is reflected by a third 90° turning prism to be focused into said cell; and wherein said first polarized beam and said second polarized beam are focused into said phase conjugate cell to cross the path of said seed beam before said first polarized beam and said second polarized beam each reach their respective beam waists to achieve Brillouin enhanced four wave mixing.

14. An apparatus for phase and birefringence correction, comprising:

a laser oscillator;

a polarized beam of light produced by said oscillator;

a first thin film polarizer to reflect said polarized beam of light;

a Faraday rotator in series combination with a first half wave plate to rotate said polarized beam of light;

a second thin film polarizer to split said beam of light into two orthogonally polarized beams comprising a signal beam and a seed beam;

a first series of optical elements comprising a first negative lens, a first positive lens, a first saturable absorber, a first laser head, a second negative lens, a second saturable absorber, a focusing lens and a cell containing a medium which is capable of Brillouin excitation, wherein said seed beam propagates through said first series of optical elements to be focused by said focusing lens into said cell; and a second series of optical elements comprising a spatial filter, a polarizer, a second Faraday rotator, a second laser head, third negative lens, a second positive lens, a third laser head, a fourth negative lens, a first turning mirror, said first saturable absorber, said first laser head, said second negative lens, said second saturable absorber, a fourth laser head, a Rochon prism and a first 90° turning prism, wherein said signal beam passes through said second series of optical elements to be separated by said Rochon prism into two orthogonally polarized beams comprising a first polarized beam and a second polarized beam, wherein the polarization of said first polarized beam is parallel to the polarization of said seed beam, wherein the polarization of said second polarized beam is perpendicular to the polarization of said first polarized beam and said seed beam, wherein said second polarized beam is reflected from a second 90° turning prism and then passes through a second half wave plate to be focused by said focusing lens into said cell;

wherein said first polarized beam is reflected by a third 90° turning prism to be focused into said cell; and wherein said first polarized beam and said second polarized beam are focused into said phase conjugate cell to a point contained within the focused cone of said seed beam, wherein a phonon seed is initiated, wherein said phonon seed is amplified within said cell to conjugate said seed beam and return said seed beam upon its path, wherein said seed beam interferes with said first polarized beam and said second polarized beam to produce a standing wave pattern which excites phonons to form a grating pattern that phase conjugates said first polarized beam and said second polarized beam and returns them along the same path on which they came, wherein said first polarized beam and said second polarized beam are recombined in said Rochon prism negating the effects of all birefringent and material aberations in the system.

15. The apparatus of claim 14, wherein said laser oscillator comprises an Nd:YAG laser, providing a 300 mJ beam with 10 ns pulses at 10 Hz of 1064 nm wavelength light.

16. The apparatus of claim 14, wherein said first Faraday rotator comprises a 10 mm aperture, said first laser head comprises a 12.5 mm aperture, said second Faraday rotator comprises a 25 mm aperture, said second laser head and said third laser head comprise a 25 mm aperture, said second positive lens comprises a focal length of 500 mm, said fourth negative lens comprises a 250 mm focal length and said fourth laser head comprises a 9 mm aperture.

17. The apparatus of claim 14, wherein said signal beam comprises 20 µJ and said seed beam comprises 300 mJ.

18. The apparatus of claim 14, wherein said cell contains a medium capable of Brillouin excitation.

19. The apparatus of claim 18, wherein said medium is selected from a group consisting of acetone, $CCl_2$, Freon and $CS_2$.

20. The apparatus of claim 18, wherein said medium is a high pressure gas.

\* \* \* \* \*